Aug. 8, 1939.  J. ZENEWICH  2,168,505
WALLPAPER PLACEMENT AND ALIGNING MEANS
Filed Feb. 21, 1939  2 Sheets-Sheet 1

Inventor
Joseph Zenewich
By Clarence A. O'Brien
and Hyman Berman
Attorneys

Aug. 8, 1939.  J. ZENEWICH  2,168,505
WALLPAPER PLACEMENT AND ALIGNING MEANS
Filed Feb. 21, 1939  2 Sheets-Sheet 2
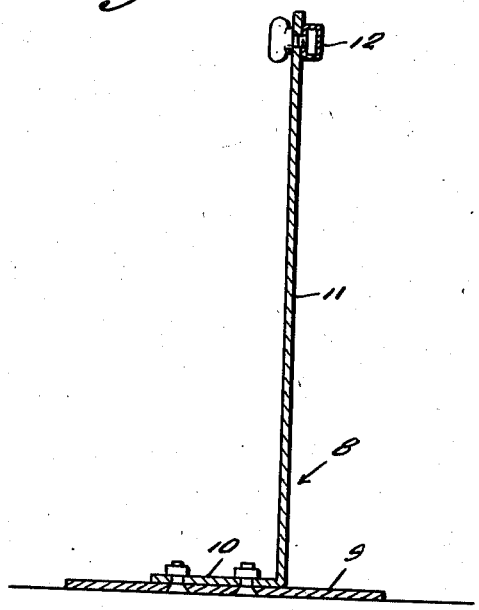
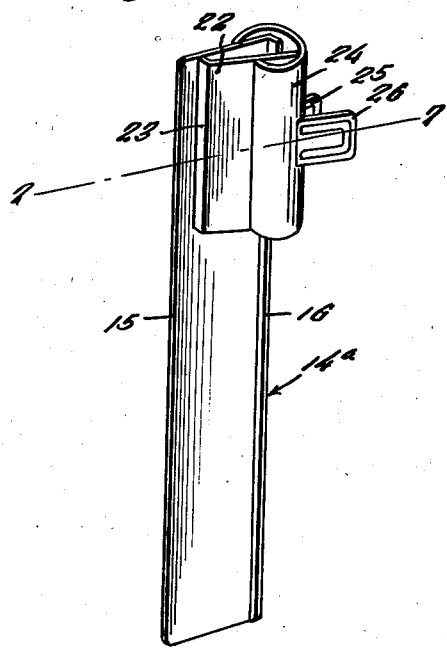
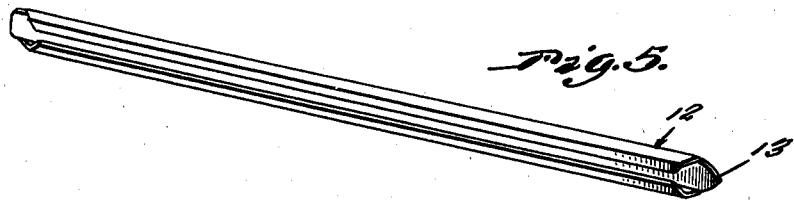
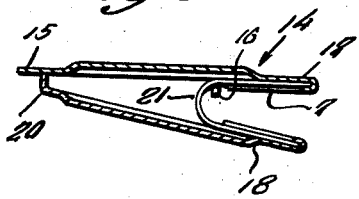
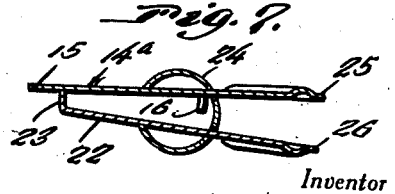
Inventor
Joseph Zenewich
By Clarence A. O'Brien
and Hyman Berman
Attorneys Patented Aug. 8, 1939

2,168,505

UNITED STATES PATENT OFFICE 2,168,505

WALLPAPER PLACEMENT AND ALIGNING MEANS

Joseph Zenewich, Chicago, Ill.

Application February 21, 1939, Serial No. 257,739

6 Claims. (Cl. 216—4)

The present invention relates to accessories, tools and equipment for use by paper-hangers and has reference in particular to novel companion appurtenances coordinated to function as means to facilitate aligning and hanging of wallpaper, particularly so called side wall strips.

In reducing to practice the principles of the invention I have conceived and perfected simple and economical contrivances having proper companionate relationship to expedite their employment, singly and collectively to accomplish the desired alignment and overlap of complemental edges of adjoining lengths of wallpaper.

I aim to improve upon prior art implements and accessories by providing a skillfully designed easy to use adaptation of parts aptly fitted for the purposes intended and otherwise susceptible of fulfilling the requirements of the trade in general.

Other features and advantages will become more readily apparent from the accompanying drawings and detailed description thereof.

In the drawings, wherein the preferred embodiments are illustrated and like reference numerals are employed to designate like elements and parts:

Figure 3 is a vertical sectional view through the indicator stand.

Figure 4 is a perspective view showing a different style or type of wallpaper gage attachment.

Figure 5 is a perspective view of the adjustable pointer or indicator.

Figure 6 is a detail section taken approximately on the plane of the line 6—6 of Figure 2.

Figure 7 is a similar cross sectional view taken approximately on the plane of the line 7—7 of Figure 4.

Figures 1, 2:
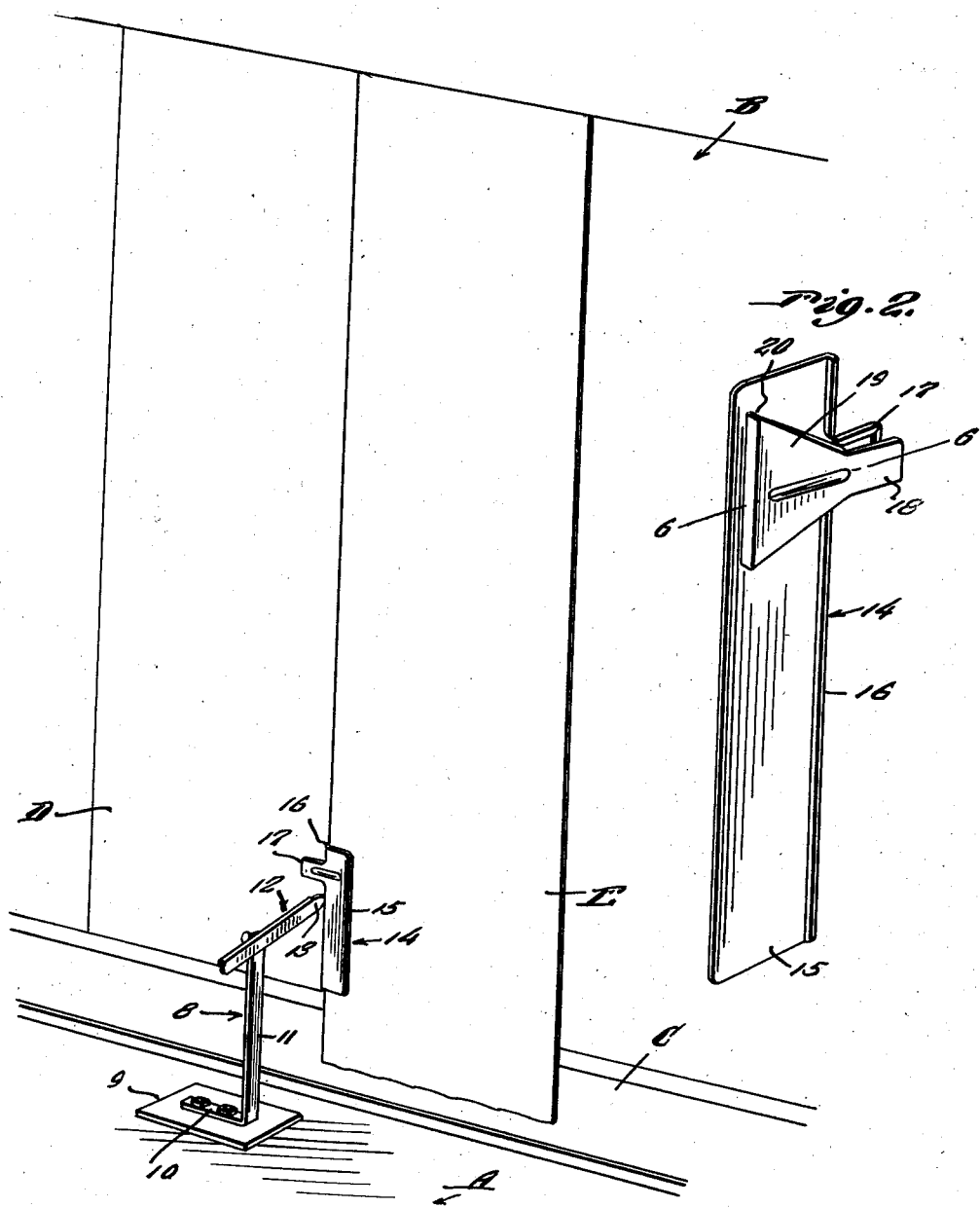
Figure 1 is a perspective view showing in a fragmentary diagrammatic way the method of using the invention to best advantage, the complete assembly of the invention itself being here shown in perspective drawing.
Figure 2 is a perspective view of the wallpaper attachment, this functioning somewhat as a plumb bob and straight-edge abutment means.

Referring now to the drawings by distinguishing reference characters, I call attention first to the floor A, the wall B, the washboard or baseboard C, the permanently attached strip of wallpaper D and the next adjacent loose hanging strip E in the process of hanging alignment ready for attachment.

The portable stand is denoted by the numeral 8. This comprises a base plate 9 of appropriate shape and proportion to rest on the floor. The standard is L-shaped and the horizontal shank or limb is suitably fastened to the base plate. The vertical or perpendicular limb 11 rises to the desired elevation. The indicator or pointer 12 is detachably and adjustably mounted on the upper end of the standard, that is to say, it can be tilted up and down in a vertical plane or shifted back and forth in a horizontal plane to position the finger or point 13 in proper relation to the edge of the attached strip D. The adjustable feature of the index or pointer is desirable to take care of the washboards of varying heights, and to allow the base plate to be placed in the most convenient position for easy shifting and handling.

The gage attachment which cooperates with the index or pointer is referred to generally or unitarily by the numeral 14. It is a pendulous structure somewhat in the nature of a self-adapting plumb bob. By preference it comprises a longitudinally elongated or rectangular plate 15 having a laterally directed longitudinal flange 16 which functions as a straight edge and abuts one edge of the hanging strip E. Adjacent what may be called the upper end a plate is provided with an integral finger piece 17, this being opposed to a complemental finger piece 18 on the spring jaw or clip 19. The clip has a suitable jaw face or flange 20 and is assembled on the plate by a U-spring 21, as shown to advantage in Figure 6.

The same fundamental idea is carried out in Figure 4. That is to say, the gage swing check device 14a comprises the same plate 15 having a straight-edge flange 16. In this arrangement, however, I utilize an auxiliary plate 22 with a right angular paper engaging flange 23. The plates are maintained in assembled relation by a U-shaped spring 24, the finger grips or handles 25 and 26 extending through apertures in the web portion of the spring. In both forms of the devices 14 and 14a, we have the straight-edge plate and yieldable gripping or clipping means to hold it on the strip of wallpaper.

In use the stand is located on the floor in about the point shown in Figure 1. Then the pointer or index arm is swung and tilted to the proper height and position so that the finger 13 points to the place of overlap between the fixed strip D and the applicable free hanging strip E. After the strip E has been first pasted the device 14 is attached to one edge thereof, the flange 16 coming against the longitudinal edge of the paper and the finger grips pointing to the left at an elevation above the pointer. Thus it will be seen that when the paper-hanger is ready to place the paper on the wall, and after the paper has been pasted and the clip applied, the upper lefthand edge of the paper is aligned at the proper place on the wall by hand and the paper is balanced in the hands until the device 14, by its weight—functioning as a plumb bob—swings over and strikes the cross arm or pointer gently. This shows that the lower end of the paper is in proper relationship with the corresponding end of the attached strip and facilitates proper aligning and expeditious pasting of the strip E in place. By following this operation progressively, the strips of paper can be applied with certainty.

It is thought that the description taken in connection with the drawings will enable a clear understanding of the invention to be had. Therefore, a more lengthy description is thought unnecessary.

While the preferred embodiment of the invention has been shown and described, it is to be understood that minor changes may be resorted to if they come within the scope of the appended claims.

I claim:

1. In an assemblage of the class described, in combination, an index device and means for supporting it at a predetermined position in relation to the edge of a fixed sheet of wallpaper, and a companion weighted device applicable to a relatively movable companion sheet of wallpaper, said device being adapted to strike the index device in the manner and for the purposes described.

2. In an assemblage of the class described, weighted attachment means applicable to a predetermined portion of a partially pasted strip of wallpaper, and a relatively stationary companion pointer adapted to abut the adjacent longitudinal edge portion of said attachment means.

3. In a structural assemblage of the class described, a floor stand, an adjustable pointer carried by said stand, and guiding and aligning means detachably applicable to a strip of wallpaper and adapted to abut the pointer.

4. In a wallpaper strip placement and aligning means of the class described, in combination, a floor stand comprising a base plate, a standard rising vertically therefrom, an arm adjustably mounted on the standard and provided with a paper placement indicating pointer, and a complemental plate having clip means for temporarily attaching it to a sheet of wallpaper for striking cooperation with the pointer in the manner and for the purposes stated.

5. In an assemblage of the class described in combination, an index device and means for supporting it at a predetermined position in relation to the edge of a fixed sheet of wallpaper, and a companion weighted device applicable to a relatively movable companion sheet of wallpaper, said device comprising a double functioning straight-edge and abutment plate of longitudinally elongated rectangular form having one longitudinal edge bent at right angles to form the aforesaid combined straight edge and abutment, said abutment being engageable with the index device, and spring clip means mounted on said plate to detachably and temporarily clamp the plate on said relatively movable companion sheet of wallpaper.

6. As a new article of manufacture and a component part of a wallpaper placement and aligning assembly of the class described, a longitudinally elongated rectangular plate having one longitudinal edge bent at right angles to form a combined straight-edge and abutment, said abutment being adapted to contact an index device forming a part of the aforementioned placement and aligning assembly, said plate on the flange side being provided with an outstanding integral finger-grip, and spring clip means mounted on the plate and including a finger-grip opposed in parallelism to said first named finger-grip.

JOSEPH ZENEWICH.